US012614724B2

(12) United States Patent
Kim et al.

(10) Patent No.: US 12,614,724 B2
(45) Date of Patent: Apr. 28, 2026

(54) CATHODE ACTIVE MATERIAL FOR LITHIUM SECONDARY BATTERY, AND LITHIUM SECONDARY BATTERY INCLUDING SAME

(71) Applicants:POSCO Holdings Inc., Seoul (KR); RESEARCH INSTITUTE OF INDUSTRIAL SCIENCE & TECHNOLOGY, Pohang-si (KR); POSCO FUTURE M CO., LTD., Pohang-si (KR)

(72) Inventors: Junghoon Kim, Incheon (KR); Chang Joo Han, Seongnam-si (KR); Young Sang Kim, Incheon (KR); Sang Cheol Nam, Seoul (KR); Geun Hwangbo, Incheon (KR)

(73) Assignees: POSCO Holdings Inc., Seoul (KR); RESEARCH INSTITUTE OF INDUSTRIAL SCIENCE & TECHNOLOGY, Pohang-si (KR); POSCO FUTURE M CO., LTD., Pohang-si (KR)

( * ) Notice: Subject to any disclaimer, the term of this patent is extended or adjusted under 35 U.S.C. 154(b) by 733 days.

(21) Appl. No.: 17/766,342

(22) PCT Filed: Oct. 2, 2019

(86) PCT No.: PCT/KR2019/012962
§ 371 (c)(1),
(2) Date: May 24, 2022

(87) PCT Pub. No.: WO2021/066229
PCT Pub. Date: Apr. 8, 2021

(65) Prior Publication Data
US 2024/0055592 A1     Feb. 15, 2024

(51) Int. Cl.
*H01M 4/525* (2010.01)
*C01G 53/50* (2025.01)
(Continued)

(52) U.S. Cl.
CPC ............ *H01M 4/525* (2013.01); *C01G 53/50* (2013.01); *H01M 4/131* (2013.01); *H01M 4/505* (2013.01);
(Continued)

(58) Field of Classification Search
CPC ...... H01M 4/525; H01M 4/131; H01M 4/505; H01M 10/052; H01M 2004/021;
(Continued)

(56) References Cited

U.S. PATENT DOCUMENTS

2009/0297947 A1    12/2009  Deng et al.
2016/0190595 A1*    6/2016  Takahata ............... H01M 4/485
                                                        429/188
(Continued)

FOREIGN PATENT DOCUMENTS

CN         103456916 A     12/2013
EP         4 037 025 A1     8/2022
(Continued)

OTHER PUBLICATIONS

Notification of Reasons for Refusal dated Apr. 4, 2023 from the Japanese Patent Office in Application No. 2022-520064.
(Continued)

*Primary Examiner* — Nicole M. Buie-Hatcher
*Assistant Examiner* — Taylor Harrison Krone
(74) *Attorney, Agent, or Firm* — Sughrue Mion, PLLC

(57) ABSTRACT

It is related to a positive electrode active material for lithium secondary battery, and to a lithium secondary battery containing the same. To improve the battery characteristics of high-capacity positive electrode materials by simultaneously
(Continued)

doping tungsten (W) element, which has an excellent effect on electrical conductivity, and boron (B) element, which is positioned on the surface to suppress the negative reaction of residual lithium and electrolyte solution.

6 Claims, 17 Drawing Sheets

(51) Int. Cl.

| | | |
|---|---|---|
| *H01M 4/02* | (2006.01) | |
| *H01M 4/131* | (2010.01) | |
| *H01M 4/505* | (2010.01) | |
| *H01M 10/052* | (2010.01) | |

(52) U.S. Cl.
CPC ....... *H01M 10/052* (2013.01); *C01P 2002/52* (2013.01); *C01P 2002/72* (2013.01); *C01P 2002/85* (2013.01); *C01P 2004/03* (2013.01); *C01P 2004/04* (2013.01); *C01P 2004/50* (2013.01); *C01P 2006/12* (2013.01); *C01P 2006/40* (2013.01); *H01M 2004/021* (2013.01); *H01M 2004/028* (2013.01)

(58) Field of Classification Search
CPC .............. H01M 2004/028; C01G 53/50; C01P 2002/52; C01P 2002/72; C01P 2002/85; C01P 2004/03; C01P 2004/04; C01P 2004/50; C01P 2006/12; C01P 2006/40
See application file for complete search history.

(56) References Cited

U.S. PATENT DOCUMENTS

| | | | |
|---|---|---|---|
| 2016/0301071 | A1 | 10/2016 | Shizuka et al. |
| 2018/0048015 | A1* | 2/2018 | Lee ..................... H01M 10/058 |
| 2018/0287202 | A1* | 10/2018 | Matsushita ........... H01M 4/366 |
| 2020/0161650 | A1* | 5/2020 | Park ...................... C01G 53/50 |
| 2020/0403240 | A1* | 12/2020 | Sun ....................... H01M 4/382 |

FOREIGN PATENT DOCUMENTS

| | | | |
|---|---|---|---|
| JP | 2008-270161 | A | 11/2008 |
| JP | 2009-117241 | A | 5/2009 |
| JP | 2009-289726 | A | 12/2009 |
| JP | 2013-239434 | A | 11/2013 |
| JP | 2015-122234 | A | 7/2015 |
| JP | 2015-201432 | A | 11/2015 |
| JP | 2017-007918 | A | 7/2017 |
| JP | 10-2017-0115938 | A | 10/2017 |
| KR | 10-2017-0063395 | A | 6/2017 |
| KR | 10-2017-0063408 | A | 6/2017 |
| KR | 10-2017-0063415 | A | 6/2017 |
| KR | 10-2017-0075596 | A | 7/2017 |
| KR | 10-1759445 | B1 | 7/2017 |
| KR | 10-2017-0103662 | A | 9/2017 |
| KR | 10-2019-0059249 | A | 5/2019 |
| KR | 10-2019-0062278 | A | 6/2019 |
| KR | 10-2019-0086399 | A | 7/2019 |
| KR | 10-2019-0086403 | A | 7/2019 |
| KR | 10-2020-0029803 | A | 3/2020 |
| WO | 2019/139445 | A1 | 7/2019 |

OTHER PUBLICATIONS

Extended European Search Report dated Aug. 31, 2022 in European Application No. 19947944.5.
Written Opinion for PCT/KR2019/012962, dated Jun. 29, 2020.
International Search Report for PCT/KR2019/012962, dated Jun. 29, 2020.
Office Action issued Oct. 31, 2023 in Chinese Application No. 201980101043.X.

* cited by examiner

[FIG. 1]
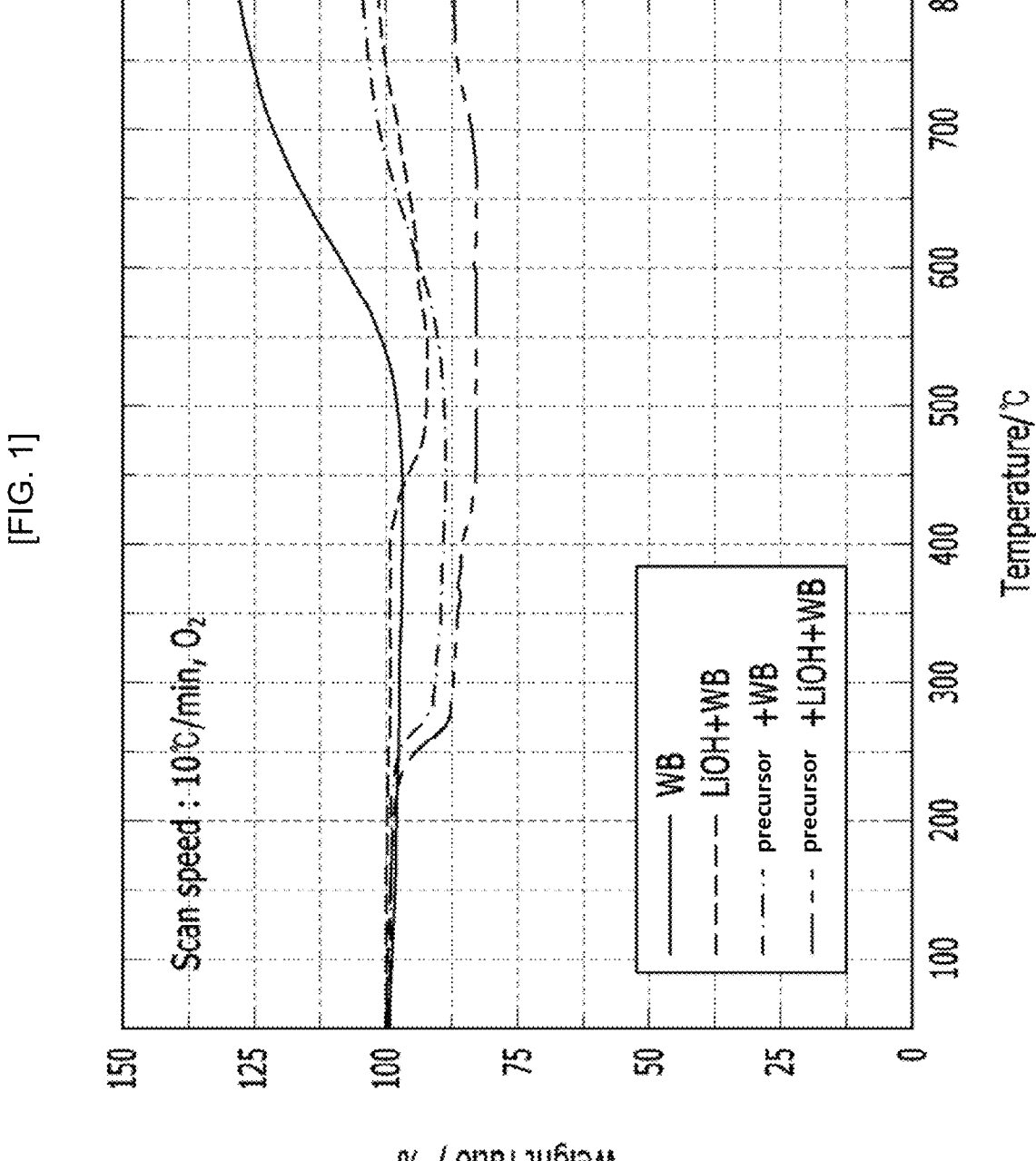

[FIG. 2A]
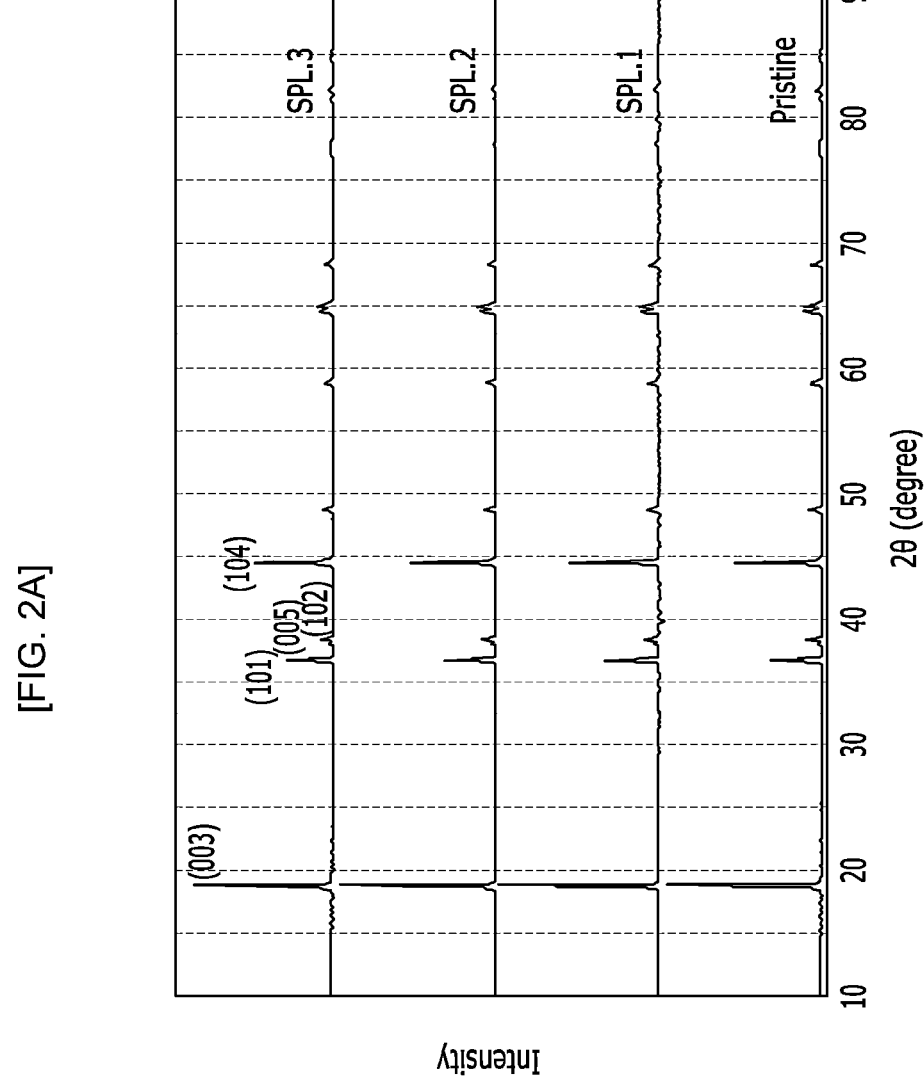

[FIG. 2B]
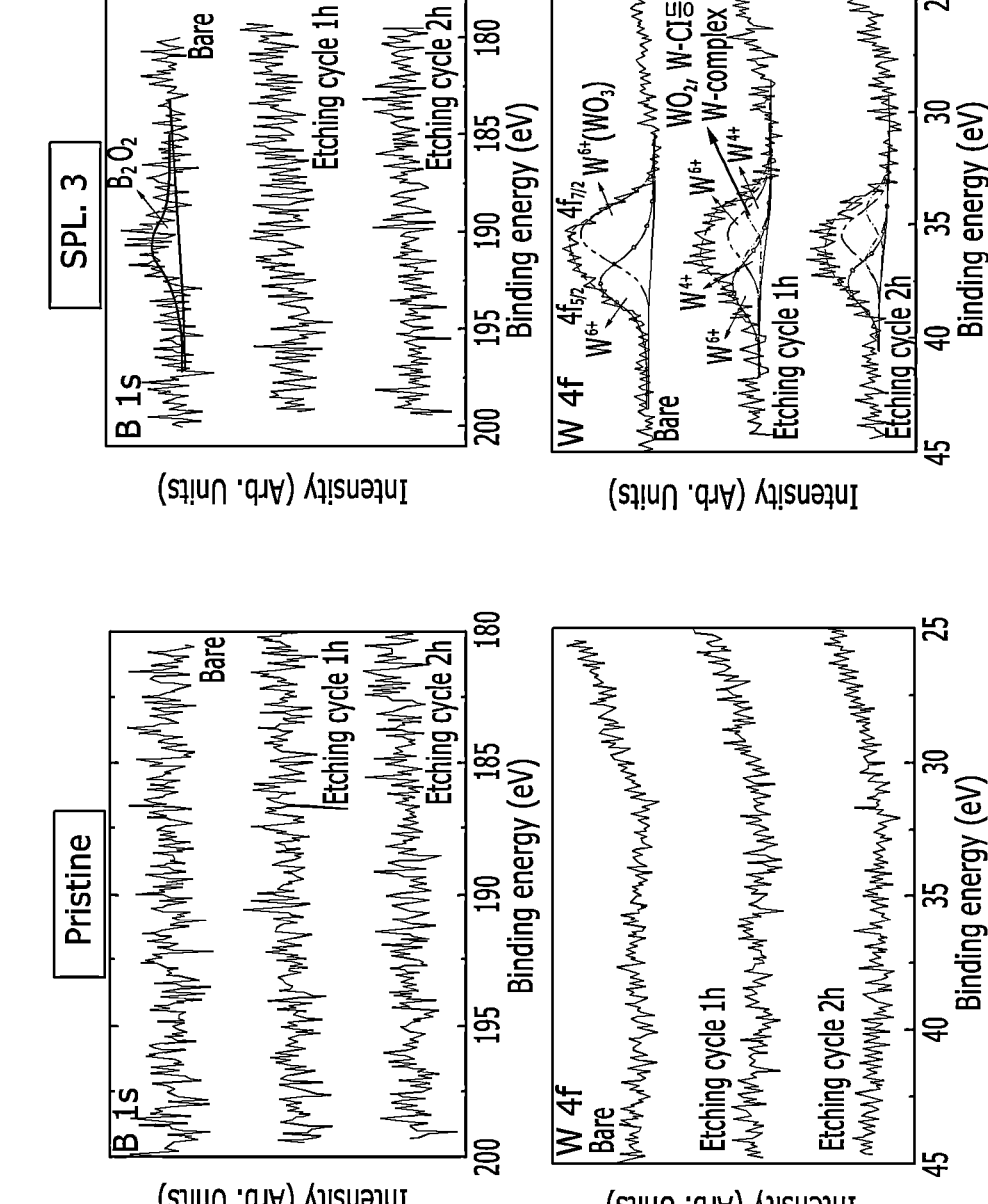

【FIG. 3A】
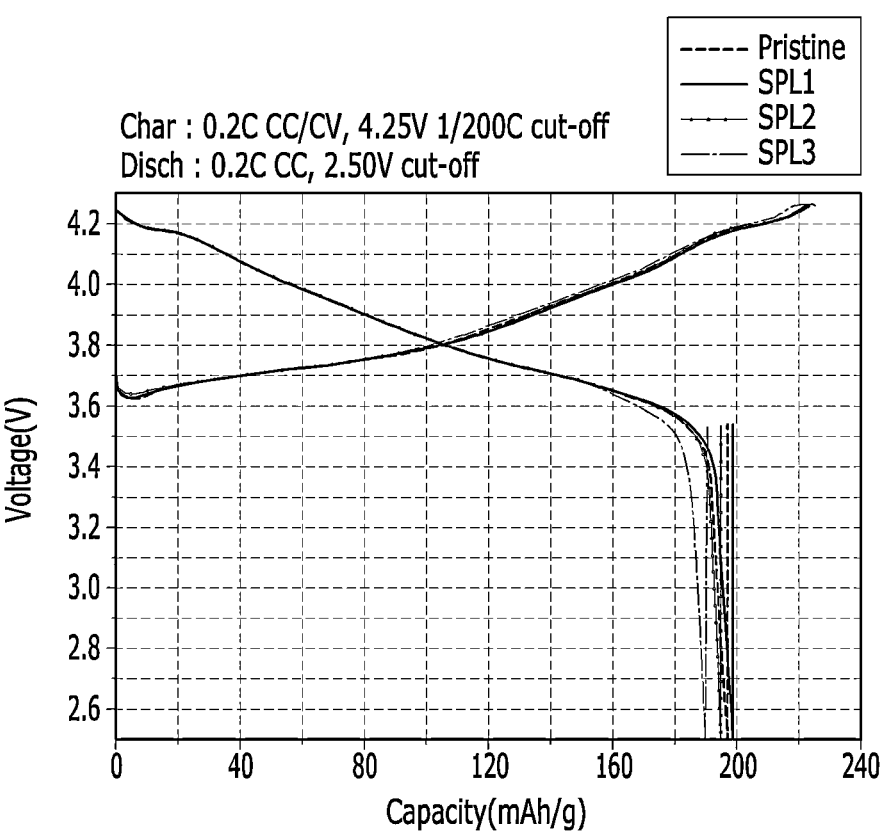

【FIG. 3B】
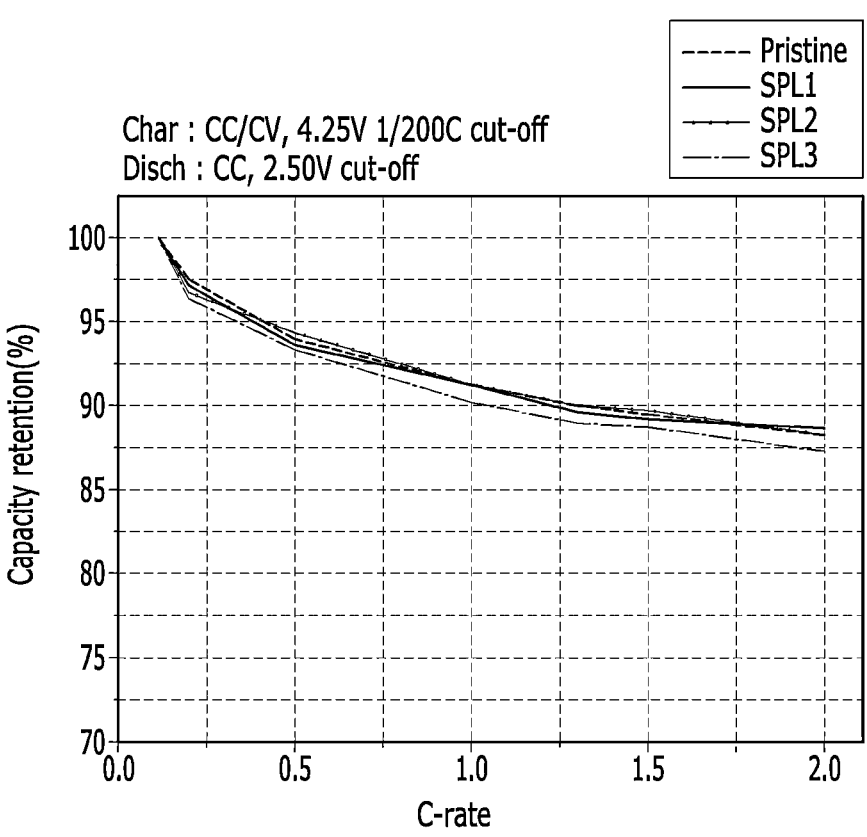

【FIG. 4A】
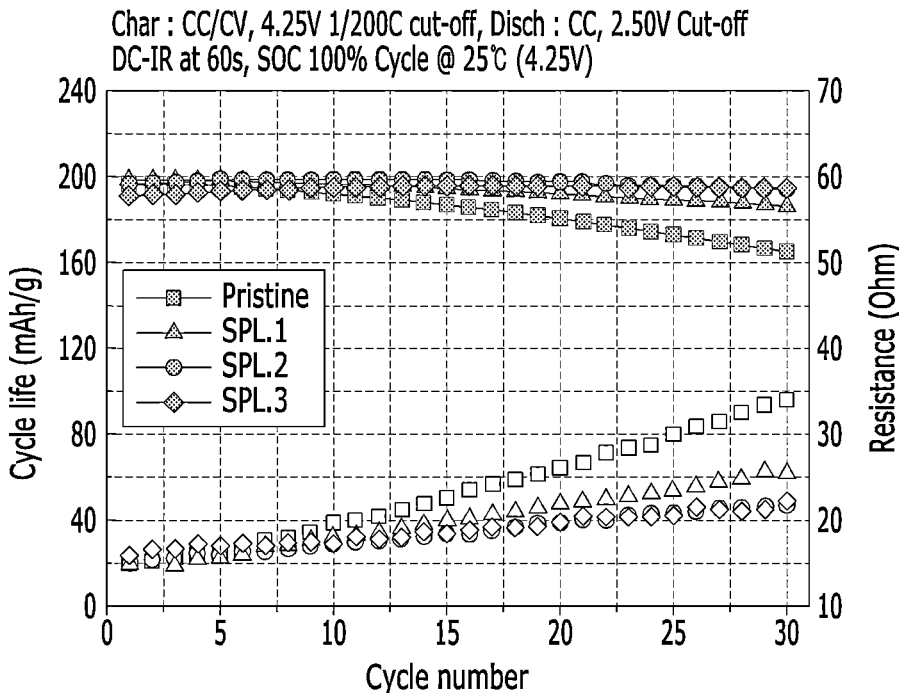

【FIG. 4B】
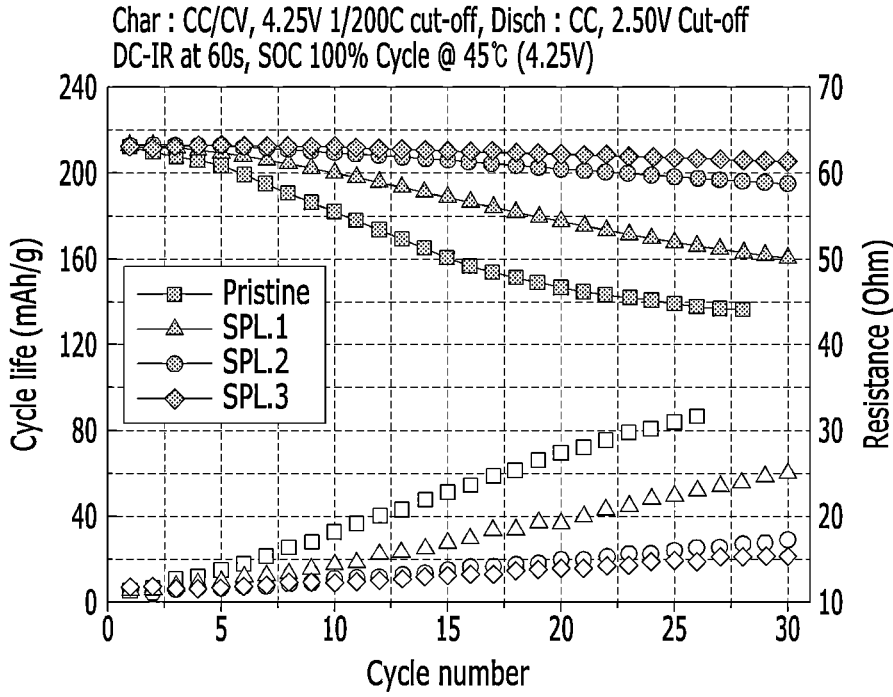

[Fig. 5A]
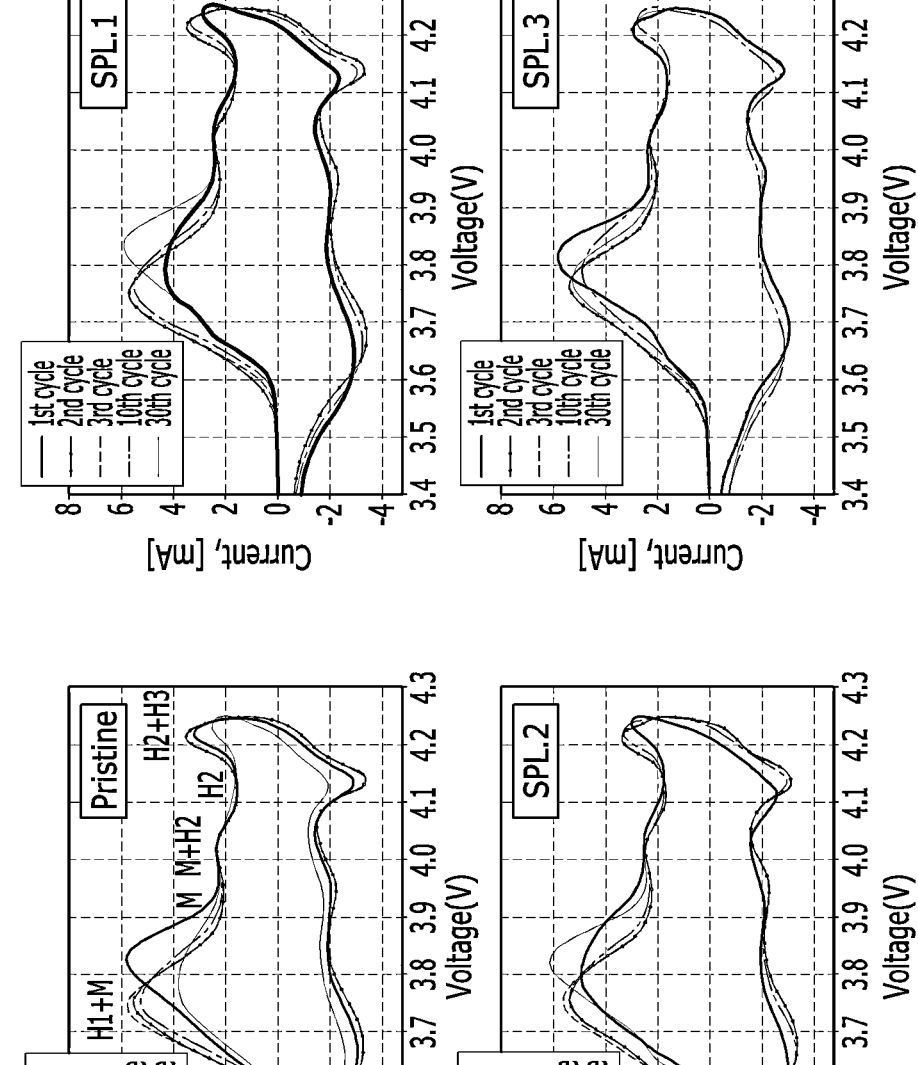

[FIG. 5B]
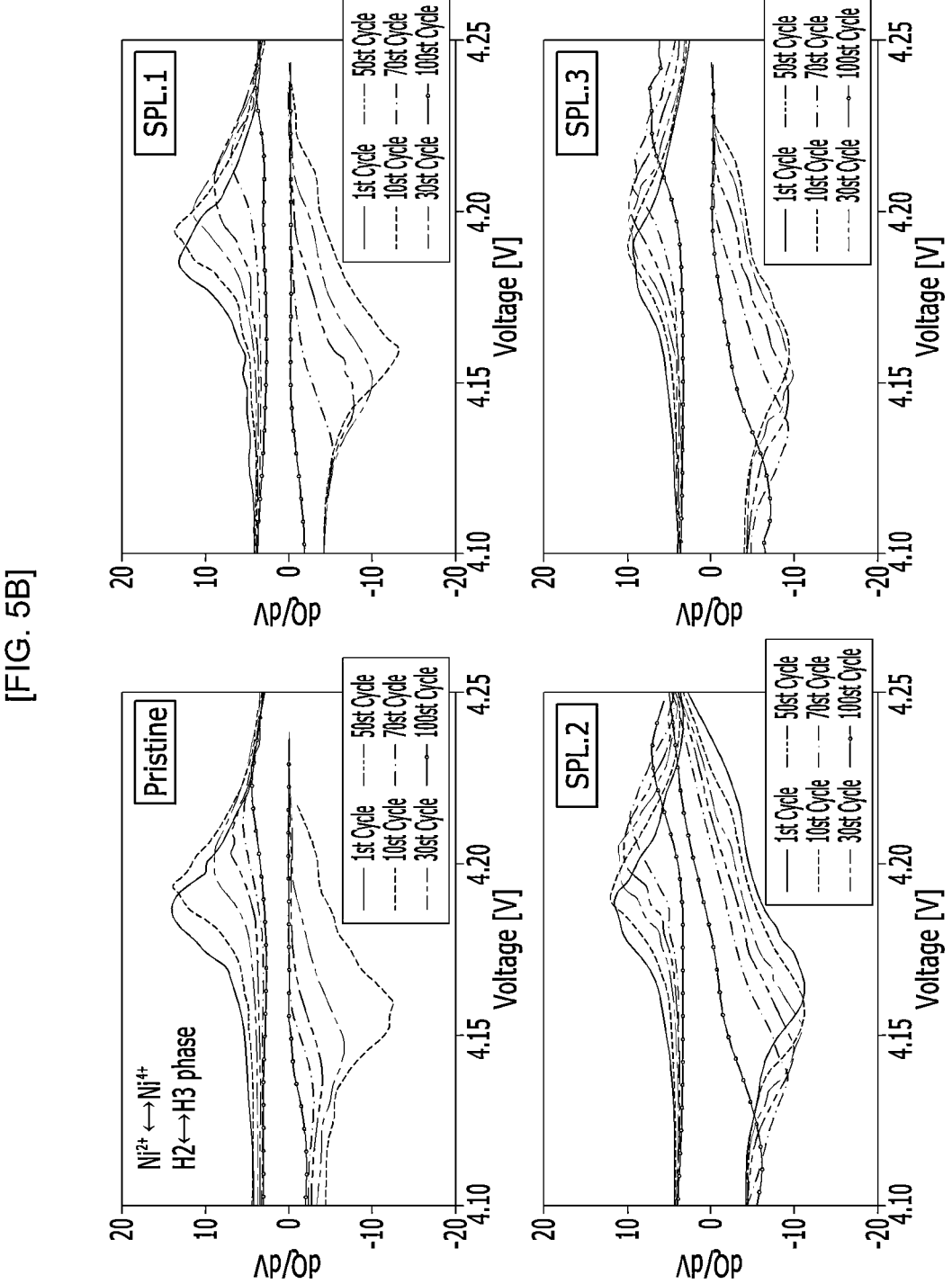

[Fig. 6]
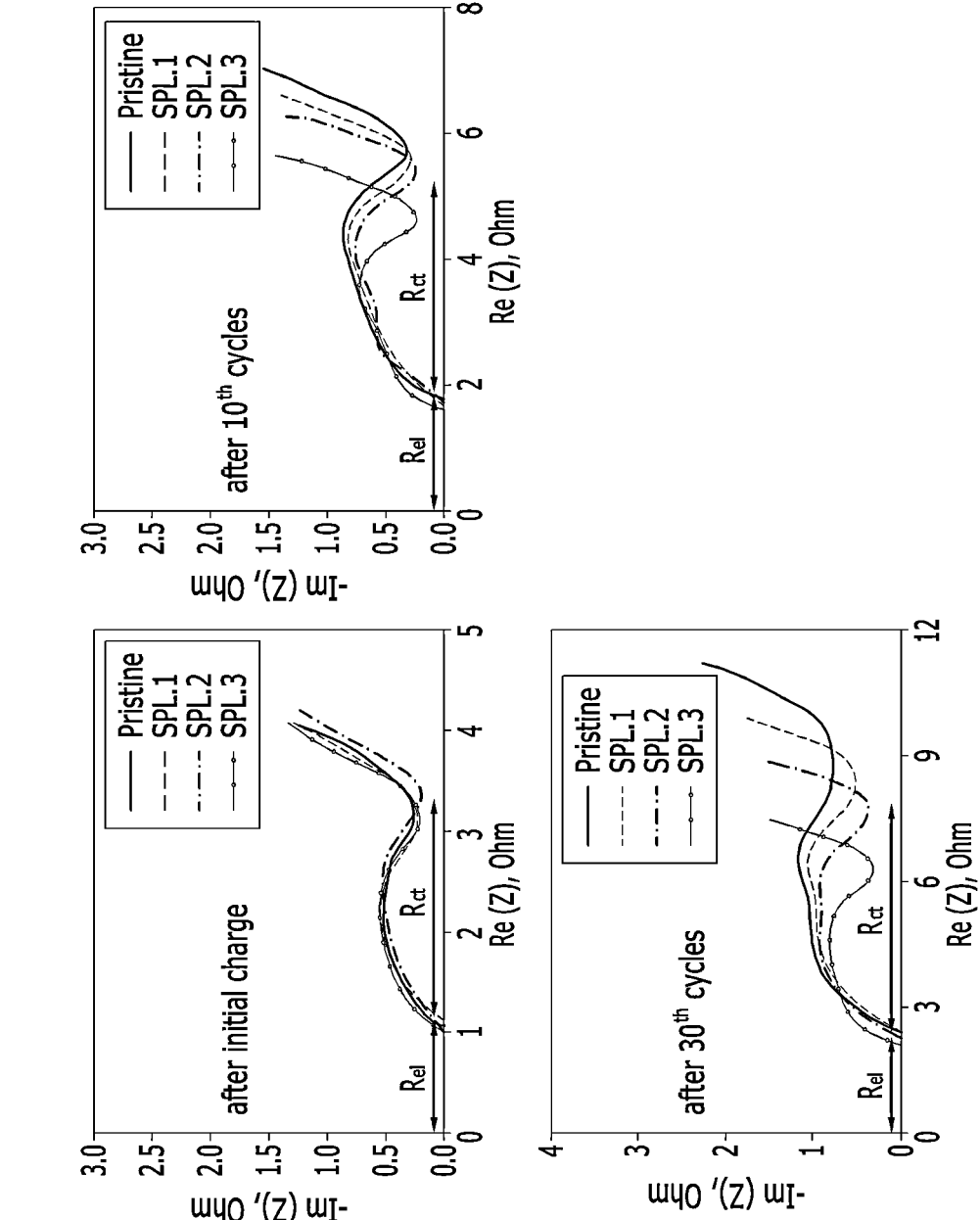

[FIG. 7]
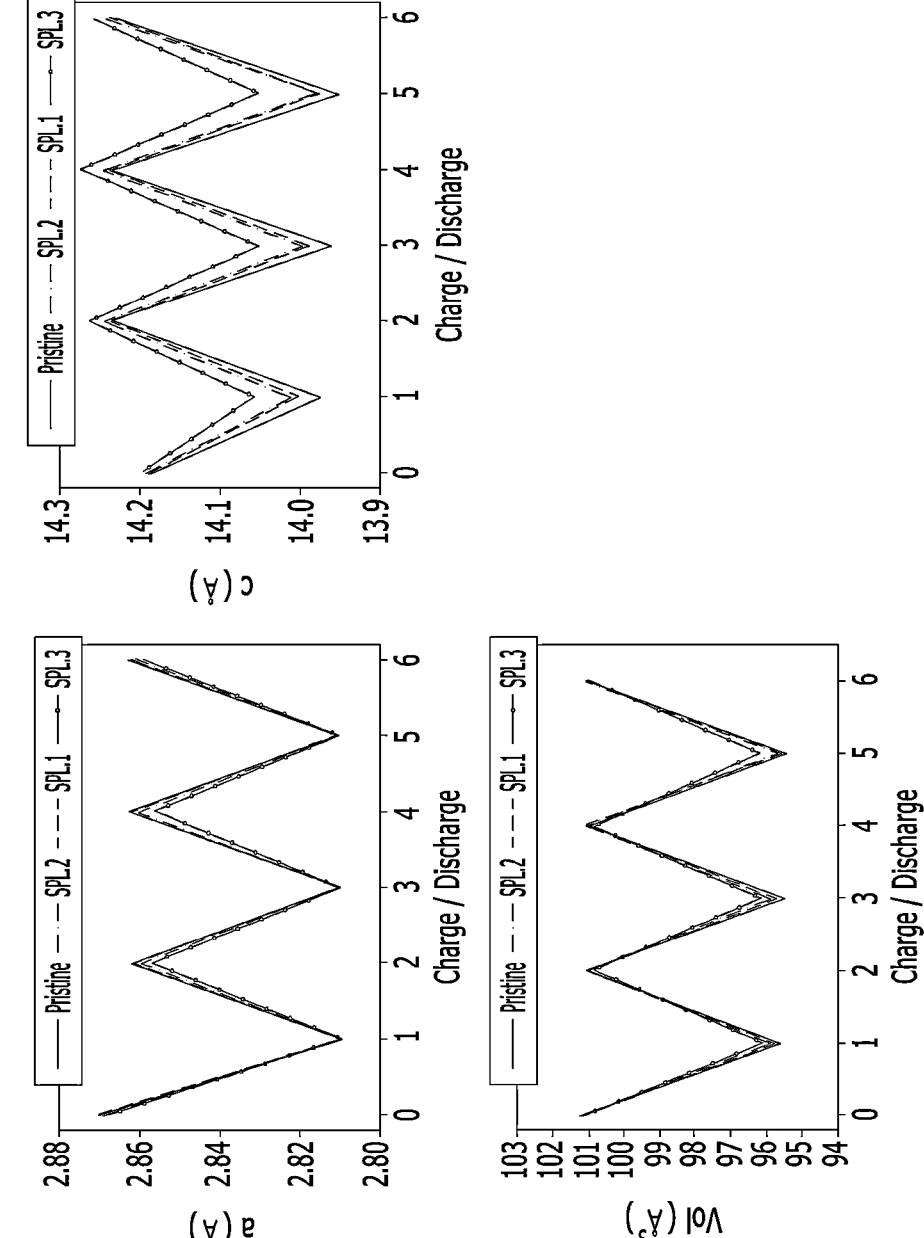

【FIG. 8】
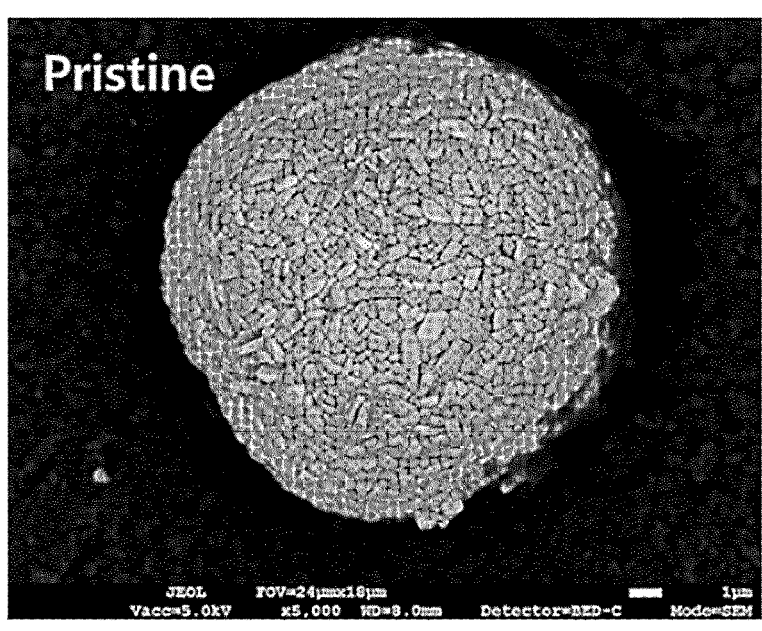
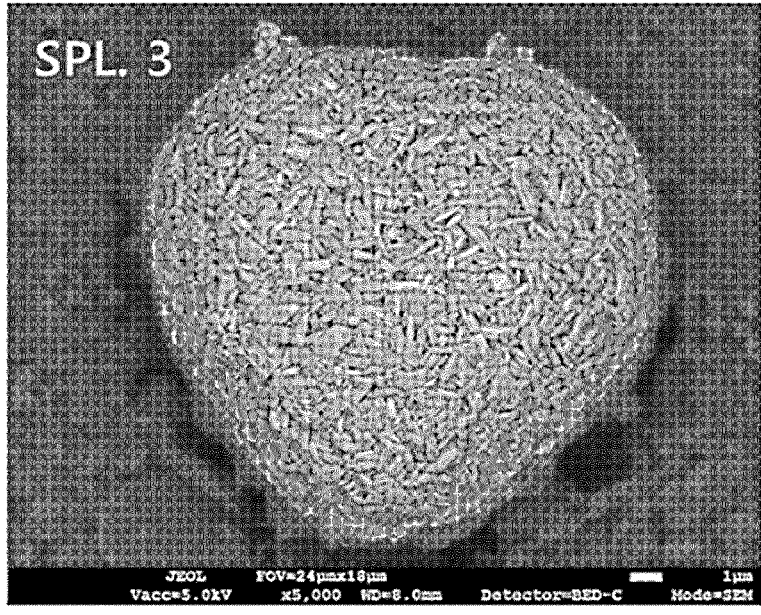

【FIG. 9】
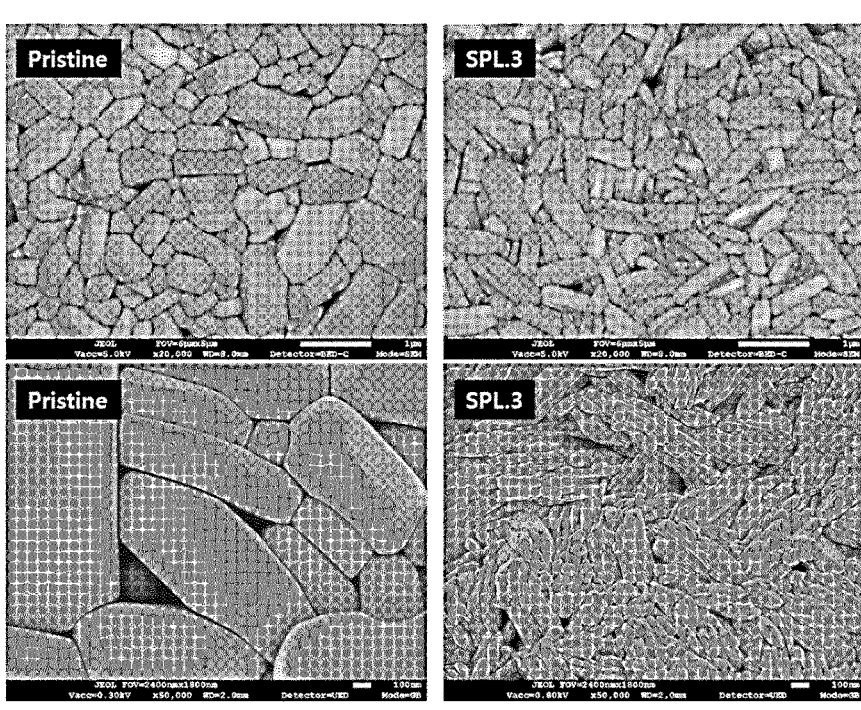

[FIG. 10]
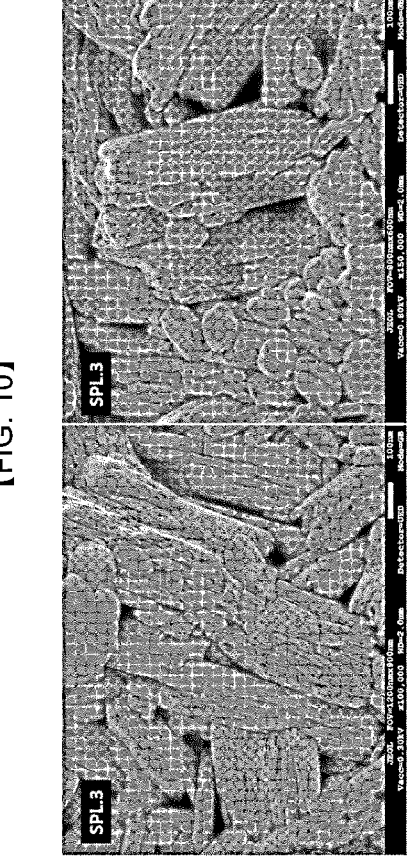

【FIG. 11】
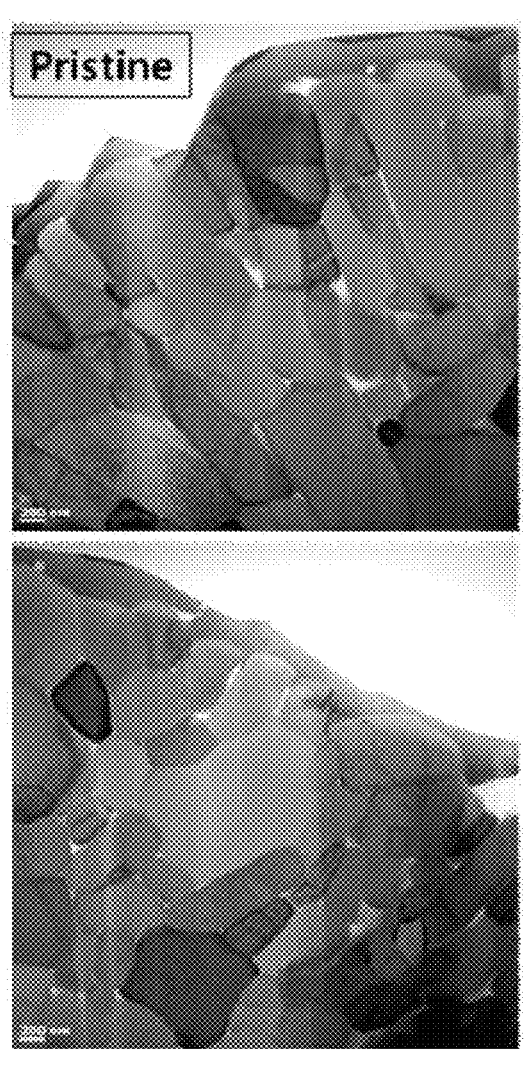
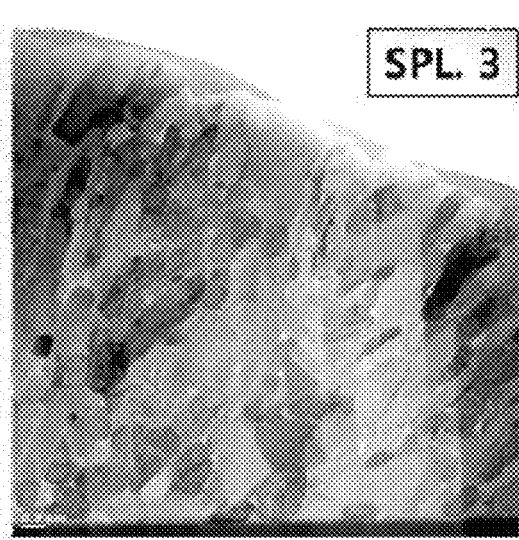
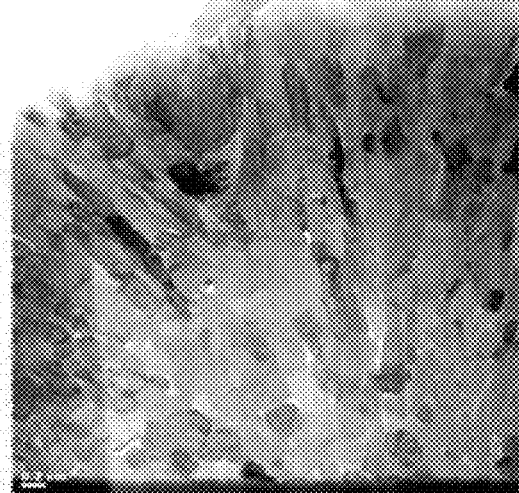

[FIG. 12]
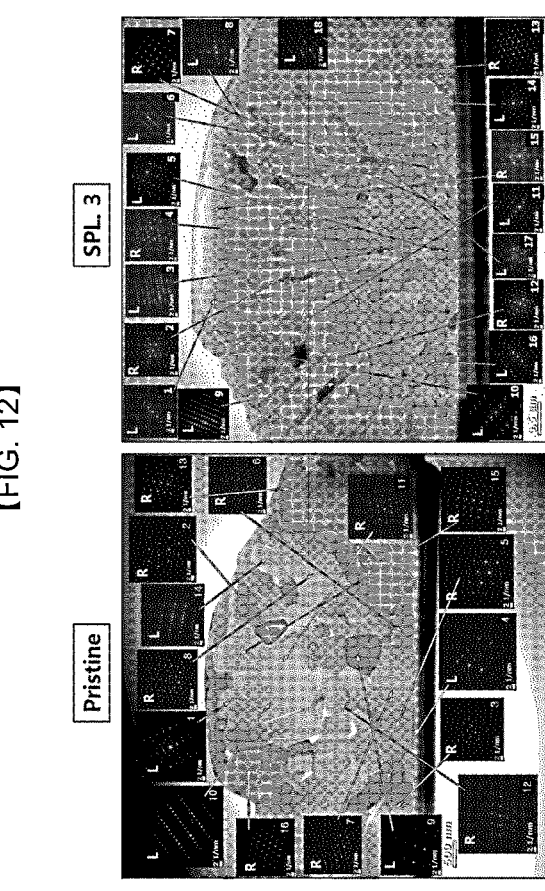

[FIG. 13]
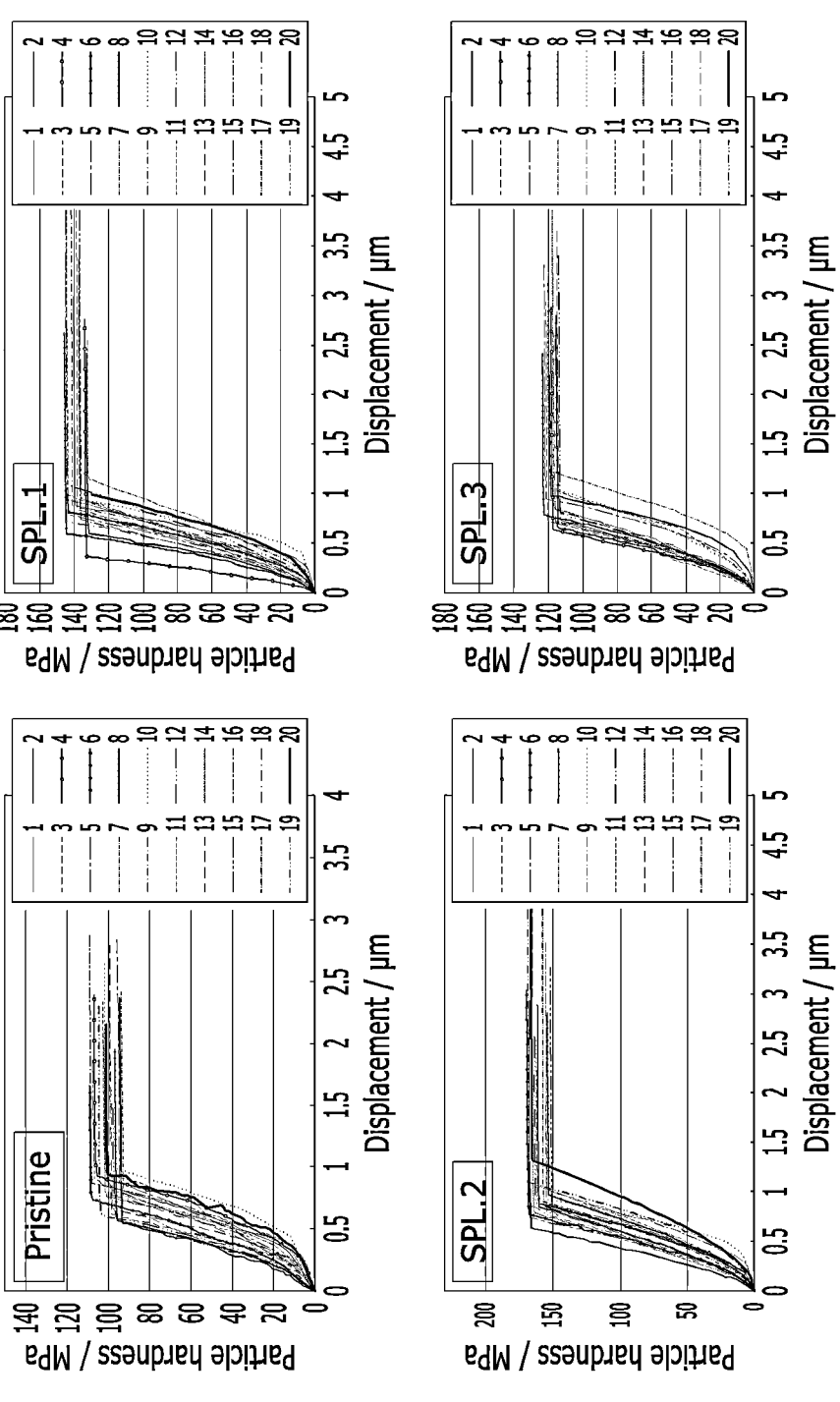

CATHODE ACTIVE MATERIAL FOR LITHIUM SECONDARY BATTERY, AND LITHIUM SECONDARY BATTERY INCLUDING SAME

CROSS-REFERENCE TO RELATED APPLICATION

This application is a National Stage of International Application No. PCT/KR2019/012962 filed Oct. 2, 2019.

BACKGROUND OF THE INVENTION

(a) Field of the Invention

The present exemplary embodiment relates to a positive electrode active material for a lithium secondary battery, and a lithium secondary battery including the same.

(b) Description of the Related Art

The lithium secondary battery is manufactured in the form of a small battery with high performance and is used as an energy storage source for mobile information communication devices including smart phones, laptops, and computers. In addition, recently, research is being conducted to manufacture a battery for high-power large-scale transportation equipment and use it in an electric vehicle (Electric Vehicle), a hybrid electric vehicle (Hybrid Electric Vehicle), and the like.

In order to cover all these small and large fields, an excellent secondary battery with charge/discharge characteristic, cycle-life characteristic, high rate characteristic, and stability at high temperature is required. In this regard, the lithium secondary battery basically meets the above requirements because it has a high voltage and high energy density. However, there are still issues that need to be addressed before it can be applied to large-scale fields.

Specifically, among the main constituent elements of a lithium secondary battery, the positive electrode active material has a higher production cost than other elements. Currently commercially available positive electrode active materials include $LiCoO_2$ and the like.

However, as well as a problem of reducing the cost of the positive electrode active material, there is a problem that the main component of the positive electrode active material is eluted as charging and discharging are repeated. In addition, when the electrolyte is decomposed by moisture inside the battery, the positive electrode active material is deteriorated or the resistance inside the battery is increased. These problems have not yet been resolved.

In addition, NCM, which can achieve high-capacity as an cathode material to replace LCO, is attracting attention, and research and development for safety and cycle-life characteristic improvement according to the high nickel composition are being actively carried out recently. If the Ni composition is increased for high-capacity, the Mn and Co content is relatively reduced, so safety and output characteristics are deteriorated, and the capacity deterioration proceeds relatively quickly. Attempts are being made to solve this problem through doping and coating processes of various elements.

BRIEF SUMMARY OF THE INVENTION

The present invention is to supplement the cycle-life characteristic problem of high-capacity cathode material High Nickel NCM. More specifically, it is intended to maintain a long cycle-life by maintaining discharge capacity and rate characteristic, and improving the capacity reduction problem.

In one embodiment of the present invention, it is provided a positive electrode active material for lithium secondary battery, wherein:

the active material is in the form of a secondary particle composed of primary particles, and the primary particle is a structure with a rough surface.

A specific area of the secondary particle may be less than or equal to 0.19 $m^2$/g. More specifically, it may be greater than 0 and less than or equal to 0.19 $m^2$/g.

A grain size of the primary particle may be 100 to 500 nm. More specifically, it may be 200 to 400 nm.

The primary particle may include both a primary particle with a layered structure and a primary particle with a Rocksalt structure.

The positive electrode active material for the lithium secondary battery is lithium metal oxide, and may be doped with tungsten (W) and boron (B).

The positive electrode active material for the lithium secondary battery is lithium metal oxide, and has a structure doped with tungsten (W) and boron (B). With respect to 1 mol % of metal in the lithium metal oxide, it may be doped with tungsten (W) 0.0005 to 0.005 mol %, and boron (B) 0.0005 to 0.005 mol %.

The positive electrode active material for the lithium secondary battery may be represented by Chemical Formula 1 below.

$$Li_a[(Ni_xCo_yMn_z)_{1-b-c}A_bA'_c]O_2 \qquad \text{[Chemical Formula 1]}$$

In the Chemical Formula 1, $0.8 \leq a \leq 1.3$, $0.001 \leq b \leq 0.015$, $0 \leq c \leq 0.1$, $0.50 \leq x \leq 0.95$, and $0 \leq y \leq 0.3$, $0 < z \leq 0.5$, A is W and B, A' is at least one selected from Zr, Ti, Al, and Mg.

The positive electrode active material for the lithium secondary battery is lithium metal oxide and has a structure doped with tungsten (W) and boron (B). In addition, the boron (B) is doped to the surface in the form of $B_2O_3$. The tungsten (W) is doped to the surface in the form of $WO_3$, and is doped to the inside in the form of $WO_2$.

In another embodiment of the present invention, a positive electrode active material for a lithium secondary battery which is lithium metal oxide, and tungsten (W) and boron (B) are doped, is provided.

The positive electrode active material for the lithium secondary battery is lithium metal oxide and has a structure doped with tungsten (W) and boron (B). Based on 1 mol % of a metal in the lithium metal oxide, tungsten (W) is doped with 0.0005 to 0.005 mol %, and boron (B) is doped with 0.0005 to 0.005 mol %.

In another embodiment of the present invention, it is provided that:

a lithium secondary battery comprises: a positive electrode; a negative electrode; and an electrolyte; wherein, the positive electrode comprises a positive electrode active material for a lithium secondary battery according to the above embodiment of the present invention.

It is possible to provide a positive electrode active material that maintains a long cycle-life by maintaining discharge capacity and rate characteristic, and improving the capacity reduction problem.

BRIEF DESCRIPTION OF THE DRAWINGS

FIG. 1 is the TGA result for the raw materials to be synthesized.

FIGS. 2a and 2b are the results of XRD and XPS analysis after cathode material synthesis.

FIGS. 3a and 3b are the initial charge and discharge curved lines and C-rate evaluation results during electrochemical evaluation.

FIGS. 4a and 4b are room temperature/high temperature cycle-life characteristic evaluation results during electrochemical evaluation.

FIGS. 5a and 5b are the results of cyclic voltammetry and Incremental capacity.

FIG. 6 is the result of impedance measurement.

FIG. 7 is the result of in-situ XRD measurement.

FIG. 8 is the morphology analysis through FE-SEM.

FIG. 9 and FIG. 10 is the result of low voltage SEM analysis.

FIG. 11 is the result of FE-TEM analysis.

FIG. 12 is the result of crystal structure analysis by diffraction pattern.

FIG. 13 is the result of particle intensity measurement.

DETAILED DESCRIPTION OF THE EMBODIMENTS

Hereinafter, an embodiment of the present invention will be described in detail. However, this is provided as an example, and the present invention is not limited thereto, and the present invention is only defined by the scope of claims to be described later.

In one embodiment of the present invention, it is provided a positive electrode active material for lithium secondary battery, wherein:

the active material is in the form of a secondary particle composed of primary particles, and the primary particle is a structure with a rough surface.

The primary particle, as described above, refers to a change in morphology during growth due to the doping effect of tungsten and boron. This will be sufficiently described in the exemplary embodiment to be described later.

The primary particle may have an average grain size of 100 to 500 nm. This is a level that shows a reduction rate of about 40-50% through the doping.

More specifically, it may be a structure (needle structure) in which the aspect ratio is increased compared to a comparative material (Pristine) that is not doped with tungsten and boron. As a result, primary particles can be formed more densely.

More specifically, it is thought that the growth of crystal grains is suppressed due to doping of tungsten, which may lead to thin and long growth of primary particles. As a result, it is presumed that the internal porosity of the secondary particles decreases.

More specifically, the voids inside the secondary particle may be 10 to 30 volume % or less compared to the comparative material (Pristine) that is not doped with tungsten and boron.

More specifically, the specific area of the secondary particle may be 0.19 m²/g or less. More specifically, due to the denser structure of the primary particle, the specific surface area of the secondary particle decreases. The decrease in the specific surface area of the secondary particles suppresses the side reaction with the electrolyte solution, thereby improving cycle-life performance and increasing particle strength.

Crystallographically, the primary particle may include both a layered primary particle and a Rocksalt structure primary particle. More specifically, the layered structure and the Rocksalt structure may be mixed.

As described above, the positive electrode active material for the lithium secondary battery is lithium metal oxide, and may be doped with tungsten (W) and boron (B).

The positive electrode active material for the lithium secondary battery is lithium metal oxide, and has a structure doped with tungsten (W) and boron (B). With respect to 1 mol % of metal in the lithium metal oxide, it may be doped with tungsten (W) 0.0005 to 0.005 mol %, and boron (B) 0.0005 to 0.005 mol %.

As a specific example, tungsten boride (WB) may be used as a doping raw material, and in this case, tungsten and boron may be doped in the same mole %.

Doping amount up to 3,000 ppm tends to decrease resistance and improve cycle-life characteristic. However, it is confirmed that the initial discharge capacity and particle strength decrease slightly at 3,000 ppm. (See FIG. 13)

More specifically, the positive electrode active material for the lithium secondary battery may be represented by Chemical Formula 1 below.

$$Li_a[(Ni_xCo_yMn_z)_{1-b-c}A_bA'_c]O_2 \qquad \text{[Chemical Formula 1]}$$

In the Chemical Formula 1, $0.8 \leq a \leq 1.3$, $0.001 \leq b \leq 0.015$, $0 \leq c \leq 0.1$, $0.50 \leq x \leq 0.95$, and $0 \leq y \leq 0.3$, $0 < z \leq 0.5$, A is W and B, A' is at least one selected from Zr, Ti, Al, and Mg.

The positive electrode active material for the lithium secondary battery is lithium metal oxide and has a structure doped with tungsten (W) and boron (B). In addition, the boron (B) is doped to the surface in the form of $B_2O_3$. The tungsten (W) is doped to the surface in the form of $WO_3$, and is doped to the inside in the form of $WO_2$.

That is, boron is positioned on the outside of the secondary particle to substantially suppress the reaction with the electrolyte solution like a coating layer.

In another embodiment of the present invention, it is provided that:

a lithium secondary battery comprises: a positive electrode; a negative electrode; and an electrolyte; wherein, the positive electrode comprises a positive electrode active material for a lithium secondary battery according to the above embodiment of the present invention.

The cathode includes a current collector and a layer of positive electrode active material formed over the current collector. The positive electrode active material layer includes the aforementioned positive electrode active material, and optionally a binder, a conductive material, or a combination thereof.

Hereinafter, the redundant description of the above-described positive electrode active material will be omitted, and the remaining components included in the lithium secondary battery will be described.

Aluminum can be used as the current collector, but is not limited thereto.

The binder is, for example, polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, nylon, etc. may be used.

The conductive material is used to impart conductivity to the electrode, and any electronic conductive material can be used without causing chemical change in the battery. Examples of the conductive material include natural graphite, artificial graphite, carbon black, acetylene black, ketjen black, carbon fiber, copper, metal powder such as nickel, aluminum, silver, metal powder, metal fiber, etc., and it can used one material such as conductive material, such as polyphenylene derivative, or a mixture of one or more materials.

The negative electrode includes a current collector and a layer of negative active material formed over the current collector.

As the current collector, copper foil, nickel foil, stainless steel foil, titanium foil, nickel foam, copper foam, a polymer substrate coated with conductive metal, or a combination thereof can be used.

The negative active material layer includes a negative active material, a binder composition, and/or a conductive material.

The negative active material includes a material capable of reversible intercalation/deintercalation of lithium ion, lithium metal, an alloy of lithium metal, a material capable of doping and dedoping lithium, or a transition metal oxide.

The description of the negative active material, binder composition, and conductive material will be omitted.

The electrolyte includes a non-aqueous organic solvent and lithium salt. The non-aqueous organic solvent and lithium salt can be applied without limitation as long as they are commercially available, so a detailed description will be omitted.

Hereinafter, preferred exemplary embodiments and test examples of the present invention will be described. However, the following exemplary embodiment is only an exemplary embodiment of the present invention, and the present invention is not limited to the following exemplary embodiment.

<Production of Positive Electrode Active Material for Lithium Secondary Battery According to an Embodiment of the Present Invention and Production of Lithium Secondary Battery (Half-Cell) Including the Same>

Comparative Example and Exemplary Embodiment 1-3: Preparation of Positive Electrode Active Material for Lithium Secondary Battery Doped with Heterogeneous Elements To achieve a desired stoichiometric molar ratio, a nickel-based metal hydroxide precursor, LiOH, a raw material for lithium, and WB (tungsten boride), a raw material for W and B, were dry mixed.

TABLE 1

| | Comparative Example | exemplary embodiment 1 | exemplary embodiment 2 | exemplary embodiment 3 | exemplary embodiment 4 |
|---|---|---|---|---|---|
| doping amount (ppm) | Pristine | WB 1,000 | WB 2,000 | WB 3,000 | WB 10,000 |
| Average grain of primary particle | 538 ± 64 nm | 396 ± 42 nm | 287 ± 37 nm | 229 ± 20 nm | 165 ± 38 nm |
| Li | 1.0113 | 1.0103 | 1.0093 | 1.0083 | 1.0014 |
| Ni | 0.8444 | 0.8435 | 0.8427 | 0.8419 | 0.8361 |
| Co | 0.1031 | 0.103 | 0.1029 | 0.1028 | 0.1021 |
| Mn | 0.0344 | 0.0343 | 0.0343 | 0.0343 | 0.034 |
| Al | 0.0182 | 0.0182 | 0.0182 | 0.0181 | 0.018 |
| W | 0 | 0.0005 | 0.001 | 0.0015 | 0.0049 |
| B | 0 | 0.0005 | 0.001 | 0.0015 | 0.0049 |

* In Table 1, elements below Li mean ratio

A mixture of a total of 100 g of dry mixture was filled in a saggar, and in a sintering furnace in an oxygen $O_2$ atmosphere, the temperature was raised to 740° C. at 2.5° C./min and maintained for 13 hours.

SPL.1 to SPL.3 were indicated according to the amount of tungsten and boron added. (WB 1,000 ppm—SPL.1, WB 2,000 ppm—SPL.2, WB 3,000 ppm—SPL.3)

A case in which tungsten and boron were not added was used as a comparative example.

The obtained material was pulverized and classified to obtain a positive electrode active material.

Manufacture of Lithium Secondary Battery (Half-Cell)

It was uniformly mixed in N-methyl-2pyrrolidone (NMP) solvent by the mass ratio of positive electrode active material, conductive material (Super-P), and binder (PVDF) of exemplary embodiment 1-3 and Comparative Example, 96.5:1.5:2 (active material:conductive material:binder).

After evenly coating the mixture on aluminum foil, NMP was evaporated through hot air drying, compressed in a roll press, and vacuum-dried in a vacuum oven at 100 to 120° C. for 12 hours to prepare a positive electrode. Li-metal is used as the counter electrode, and 1.0 mol of $LiPF_6$ solution is used as a liquid electrolyte solution in a mixed solvent of ethylene carbonate (EC):dimethyl carbonate (DMC)=1:2. According to the usual manufacturing method, a CR2032 coin-type half-cell was prepared.

Experimental Example: Characteristic Evaluation of Positive Electrode Active Material and Lithium Secondary Battery for Each Lithium Secondary Battery of the Exemplary Embodiment and Comparative Example Evaluation Method Electrochemical evaluation was performed by sequentially applying constant current and constant voltage. Rate characteristic evaluation was measured from 0.1 C to 2 C, and cycle-life characteristic evaluation was compared by measuring room temperature and high temperature up to 30 times at 0.3 C. At this time, the increase rate was confirmed by calculating the DC resistance value generated in 10 s.

The degree of shift of the oxidation-reduction peak was measured through the incremental capacity curved line, and the phase change was observed using the cyclic voltammetry in which a constant voltage was scanned per unit time. The resistance increase rate according to the cycle progress was measured by the impedance.

The change of the primary particle was confirmed through FE-SEM, and the specific primary particle shape was observed through low voltage SEM.

The surface and internal primary particle shapes of the thinly processed specimens with FIB were confirmed by FE-TEM, and average particle sizes were measured. Also, by analyzing the diffraction pattern of each grain, it was confirmed whether the crystal structure was distributed in a specific pattern.

Internal voids and specific surface area were checked with BET, and the existence of doping elements was observed while etching through XPS.

The Result of TGA Analysis

FIG. 1 is the TGA result for the raw materials to be synthesized.

The sample was mixed at an approximate weight ratio of 1:1 to confirm a clear change and observed at a temperature increase speed of 10° C. per minute from 50° C. to 800° C.

TGA analysis can determine the phenomenon at the corresponding temperature by the change in weight that occurs in each temperature section.

WB, the doping raw material, exists in the form of oxides of $WO_3$ and $B_2O_3$ in the range of 550-730° C. during $O_2$ sintering, and it can be seen that the weight increases.

When mixing WB with LiOH (MP: 462° C.), a lithium raw material, it passes the LiOH melting point and decreases in weight, then changes to oxide form and increases in weight.

When $Me(OH)_2$ precursor and WB are mixed, the precursor changes to oxide form at around 250° C., and after a certain amount of weight is reduced, the graph behavior is similar to that of WB. The sintering temperature of the precursor was set to 740° C., and it can be expected that WB exists in the form of oxide in the temperature range.

The Result of XRD and XPS Analysis

FIGS. 2a and 2b are the results of XRD and XPS analysis after cathode material synthesis.

By adding a small amount of WB, the impurity peak was not confirmed, and the pattern of a typical layered structure was confirmed. XPS performed 1 hr and 2 hr etching including the surface part to analyze the inside of the particles. Compared with pristine, in SPL.3, element B was found in the form of $B_2O_3$ oxide in a very small amount only on the surface part, and element W was confirmed in the form of $WO_3$ on the surface and complex form such as $WO_2$ and W—Cl inside. The expected result from TGA was confirmed through XPS analysis.

Initial Charge and Discharge Curved Line and C-Rate Evaluation Result

FIGS. 3a and 3b are the initial charge and discharge curved lines and C-rate evaluation results during electrochemical evaluation. The evaluation was conducted at room temperature 25° C., and the initial capacity was compared at 0.2 C. The standard capacity was 200 mAh/g and the electrode loading density was 16.5 mg/cm². C-rate was compared relative to the capacity maintenance rate according to each rate.

It was confirmed that the initial capacity and C-rate appeared at the same level even as the amount of doping element added increased, and the capacity decreased after a certain amount of addition.

The Result of Room Temperature/High Temperature Cycle-Life Characteristic Evaluation FIGS. 4a and 4b are room temperature/high temperature cycle-life characteristic evaluation results during electrochemical evaluation. In addition, by measuring the DCR value at 10 seconds of discharge of each cycle, the increment was plotted.

It was confirmed that the capacity retention rate was significantly improved compared to pristine as the added amount of WB is increased. SPL.2 and SPL.3 both show retention of 95% or more at room temperature/high temperature. In proportion to this, it was confirmed that the DCR increase rate was also improved. In order to confirm the cause of the increase in the capacity retention rate, various electrochemical evaluations were additionally performed.

The Result of Cyclic Volatammetry

FIG. 5a is the analysis result of the cyclic volatammetry.

Cyclic voltammetry (CV) was evaluated to confirm the phase transition. It is a method to check current change by scanning a certain voltage per unit time. Unlike constant current, overvoltage is not applied, so it is easy to check the phase change in the corresponding voltage.

All show similar behavior and no special peak according to WB doping is identified. However, as the amount of WB added increases, it can be seen that the shift of the oxidation-reduction peak occurs relatively little, and it can be seen that the peak shows a similar behavior to that of 10 cycles even at 30 cycles. The smooth recovery of phase transition at high voltage (4.1-4.25V) is one of the causes of higher capacity retention as the WB content increases.

The Result of Incremental Capacity (IC)

FIG. 5b is the result of Incremental capacity (IC). More specifically, the Incremental capacity (IC) was checked to confirm the degree of phase change when overvoltage occurred.

The reason why the high-capacity expression of high nickel NCM cathode material is the difference in the oxidation number of Ni ion due to the phase transition of $H_2 \leftrightarrow H_3$, which is expressed above 4.1V. The higher the intensity of the peak near 4.1V, the higher the capacity, and the smaller the peak shift, the higher the capacity retention rate. It can be confirmed that the peak of SPL.3 compared to pristine clearly maintains high intensity up to 100 cycles.

The Result of Impedance Measurement

FIG. 6 is the impedance measurement result.

Impedance was measured in the 1st, 10th, and 30th cycle, SOC100% state during cycle-life characteristic evaluation. The initial interface resistance is confirmed similarly, but as the cycle progresses, it is measured that the resistance $(R_{ct})$ increase rate of SPL.3 is small. The result is a factor of maintaining high-capacity by WB doping.

The Result of In-Situ XRD Measurement

FIG. 7 is the in-situ XRD measurement result.

In the case of electrode manufacturing, the experiment was conducted with a powder electrode type of 8:2 (active: superP) ratio, and the result is measured for 3 cycles by performing CC/CV 30 minutes at 4.25 V at a current speed of 40-60 mA/g for each cell. As the doping amount increased, it was confirmed that the a-axis, c-axis, and volume change between charging and discharging gradually decreased. It is judged that this will affect the cycle-life characteristic improvement.

Morphology Analysis Result

FIG. 8 is the morphology analysis through FE-SEM.

The morphology was observed by selecting spherical particles within 15 μm at the same magnification of 5 k. It can be seen that the primary particle is changed despite the addition of a small amount of doping element to the same precursor. Compared to pristine, the primary particle of SPL.3 has a needle-like thin shape. This part was checked in detail through low voltage SEM.

The Result of Low Voltage SEM Analysis Result

FIG. 9 and FIG. 10 is the low voltage SEM analysis result.

It was confirmed that the primary particles were more clearly contrasted at the high magnification of 30k, and the shape of the particles showed a completely different morphology in the low voltage SEM of 0.3-0.8 kV. By adding a small amount of WB doping element, the shape of the primary particle was observed as a Churros type specific shape.

FIG. 10, the magnification was increased to the maximum, and the specific shape was observed in detail.

There were concerns that the electrolyte solution and side reaction would increase due to the porous surface shape, but the BET measurements were 0.1989 m²/g (Pristine) and 0.1685 m²/g (SPL.3), respectively, confirming that the value of specific surface area decreased when WB was doped.

The result is judged to be formed into a denser internal structure as the primary particle becomes needle-like by doping. In relation to the cycle-life characteristic of electrochemical evaluation, the capacity reduction of SPL.3 is small, so the side reaction with the electrolyte solution is a decreased.

The Result of FE-TEM Analysis

FIG. 11 is the FE-TEM analysis result.

The cross section of particles was observed by thinly processing the specimen with FIB. It can be seen that the primary particles are formed in a thin shape not only on the surface but also on the inner core. Similar to the BET result, voids in the interior are relatively more observed in Pristine compared to SPL.3. As confirmed by XPS, this is the effect of the doping element W, which is also measured inside the particle. It was confirmed that grain growth was suppressed by the addition of a small amount of W doping element, so that the primary particles were not only thinned but also densely re-arranged. It was confirmed that the average grain sizes decreased from 538±64 nm (Pristine) to 229±20 nm (SPL.3) by the Astm e112 method.

Crystal Structure Analysis Result by Diffraction Pattern

FIG. 12 is the result of crystal structure analysis by diffraction pattern.

In the whole picture, the diffraction pattern of each grain was analyzed by taking the zone axis. Analysis result, it was confirmed that both samples were randomly mixed with layered and rocksalt structures regardless of the presence or absence of doping. In conclusion, the invention is judged to be the effect of the specific morphology, not the effect of the crystal structure according to the doping element.

The Result of Particle Intensity Analysis

FIG. 13 is the particle intensity analysis result of one sample unit.

The distance of the sample pressed until the sample broke or reached the specified load and the force generated at this time were calculated. Each sample was measured 20 times and the particle strength result of the sample was graphed. It can be seen that the particle intensity was significantly improved by WB doping.

The present invention is not limited to the exemplary embodiments, but can be manufactured in a variety of different forms, and a person of an ordinary skill in the technical field to which the present invention belongs is without changing the technical idea or essential features of the present invention It will be understood that the invention may be embodied in other specific forms. Therefore, it should be understood that the exemplary embodiments described above are exemplary in all respects and not restrictive.

What is claimed is:

1. A positive electrode active material for lithium secondary battery, wherein:

the positive electrode active material for the lithium secondary battery is in the form of a secondary particle composed of primary particles, the primary particle is a structure with a rough surface, the positive electrode active material for the lithium secondary battery is lithium metal oxide and has a structure doped with tungsten (W) and boron (B), based on 1 mol % of a metal in the lithium metal oxide, tungsten (W) is doped with 0.0005 to 0.005 mol %, and boron (B) is doped with 0.0005 to 0.005 mol %, doping amounts (mol %) of tungsten (W) and boron (B) are equal, a specific area of the secondary particle is 0.19 m²/g or less, and a grain size of the primary particle is 100 to 500 nm.

2. The positive electrode active material of claim 1, wherein:

the primary particle includes both a primary particle with a layered structure and a primary particle with a Rocksalt structure.

3. The positive electrode active material of claim 1, wherein:

the positive electrode active material for the lithium secondary battery is represented by Chemical Formula 1 below: [Chemical Formula 1]

$$Li_a[(Ni_xCo_yMn_z)_{1-b-c}A_bA'_c]O_2$$

in the Chemical Formula 1, it is that $0.8 \le a \le 1.3$, $0.001 \le b \le 0.015$, $0 \le c \le 0.1$, $0.50 \le x \le 0.95$, and $0 \le y \le 0.3$, $0 < z \le 0.5$, A is W and B, A' is at least one selected from Zr, Ti, Al, and Mg.

4. The positive electrode active material of claim 1, wherein:

the positive electrode active material for the lithium secondary battery is lithium metal oxide and has a structure doped with tungsten (W) and boron (B), the boron (B) is doped to the surface in the form of $B_2O_3$, the tungsten (W) is doped to the surface in the form of $WO_3$, and is doped to the inside in the form of $WO_2$.

5. A lithium secondary battery comprises:

a positive electrode;

a negative electrode; and an electrolyte;

the positive electrode comprises the positive electrode active material for the lithium secondary battery according to claim 1.

6. A positive electrode active material for lithium secondary battery, wherein, the positive electrode active material for the lithium secondary battery is a lithium metal oxide, and has a structure doped with tungsten (W) and boron (B), based on 1 mol % of a metal in the lithium metal oxide, tungsten (W) is doped with 0.0005 to 0.005 mol %, and boron (B) is doped with 0.0005 to 0.005 mol %, doping amounts (mol %) of tungsten (W) and boron (B) are equal, a specific area of a secondary particle is 0.19 m²/g or less, and a grain size of a primary particle is 100 to 500 nm.

\* \* \* \* \*